(12) United States Patent
Feldstein et al.

(10) Patent No.: US 7,979,849 B2
(45) Date of Patent: Jul. 12, 2011

(54) AUTOMATIC MODEL-BASED TESTING

(75) Inventors: Jeffrey Feldstein, Goleta, CA (US);
Robert Bosch, Novato, CA (US)

(73) Assignee: Cisco Technology, Inc., San Jose, CA (US)

( * ) Notice: Subject to any disclaimer, the term of this patent is extended or adjusted under 35 U.S.C. 154(b) by 1389 days.

(21) Appl. No.: 10/966,962

(22) Filed: Oct. 15, 2004

(65) Prior Publication Data
US 2006/0085681 A1  Apr. 20, 2006

(51) Int. Cl.
*G06F 9/44* (2006.01)
*G06F 3/048* (2006.01)

(52) U.S. Cl. ........ 717/128; 717/125; 717/126; 717/127; 714/38; 714/39; 715/763

(58) Field of Classification Search .................. 717/124, 717/125
See application file for complete search history.

(56) References Cited

U.S. PATENT DOCUMENTS

| | | | | |
|---|---|---|---|---|
| 5,394,347 A * | 2/1995 | Kita et al. | ........................ | 703/2 |
| 5,870,539 A * | 2/1999 | Schaffer | ........................ | 714/38 |
| 5,870,590 A * | 2/1999 | Kita et al. | ........................ | 716/4 |
| 6,038,378 A * | 3/2000 | Kita et al. | ........................ | 714/38 |
| 6,059,837 A * | 5/2000 | Kukula et al. | ........................ | 703/27 |
| 6,144,962 A * | 11/2000 | Weinberg et al. | ............... | 707/10 |
| 6,237,006 B1 * | 5/2001 | Weinberg et al. | ......... | 707/103 R |
| 6,360,332 B1 * | 3/2002 | Weinberg et al. | ................. | 714/4 |
| 6,385,741 B1 * | 5/2002 | Nakamura | ................... | 714/38.1 |
| 6,446,120 B1 * | 9/2002 | Dantressangle | .............. | 709/224 |
| 6,462,762 B1 * | 10/2002 | Ku et al. | ....................... | 715/853 |
| 6,577,982 B1 * | 6/2003 | Erb | .............................. | 702/120 |
| 6,775,824 B1 * | 8/2004 | Osborne et al. | ................ | 717/125 |
| 6,854,089 B1 * | 2/2005 | Santee et al. | ................... | 715/783 |
| 6,934,931 B2 * | 8/2005 | Plumer et al. | ................. | 717/104 |
| 6,934,934 B1 * | 8/2005 | Osborne et al. | ................ | 717/126 |
| 6,944,848 B2 * | 9/2005 | Hartman et al. | ............... | 717/124 |
| 6,948,152 B2 * | 9/2005 | Dubovsky | ....................... | 717/124 |
| 6,976,246 B1 * | 12/2005 | Rosaria et al. | ................. | 717/131 |
| 6,993,706 B2 * | 1/2006 | Cook | ............................ | 719/315 |
| 6,993,747 B1 * | 1/2006 | Friedman | ....................... | 717/124 |

(Continued)

OTHER PUBLICATIONS

Gao et al., "An object state test model: object state diagram", 1995, IBM Centre for Advanced Studies Conference, pp. 14.*

(Continued)

*Primary Examiner* — Thuy Dao
*Assistant Examiner* — Marina Lee
(74) *Attorney, Agent, or Firm* — Hickman Palermo Truong & Becker LLP

(57) ABSTRACT

Automatic model-based testing is disclosed, including receiving a set of objects associated with a computer program application under test; automatically classifying the objects as state objects representing states of the application, or transition objects representing transitions in the application from one state to another state, or static information objects; linking the state objects with the transition objects to result in creating a model in memory of all states and transitions provided by the application; associating, in the model, one or more tests with one or more of the state objects; creating and storing, based on the states and transitions, a finite state machine that represents execution behavior of the application according to the model; and testing the application by (a) automatically navigating the finite state machine and (b) providing state and transition data from the finite state machine to a graphical user interface functional test application that executes the one or more tests upon reaching the states represented by the state objects.

28 Claims, 8 Drawing Sheets

U.S. PATENT DOCUMENTS

| | | | | |
|---|---|---|---|---|
| 6,993,748 | B2* | 1/2006 | Schaefer | 717/124 |
| 7,000,224 | B1* | 2/2006 | Osborne et al. | 717/125 |
| 7,024,589 | B2* | 4/2006 | Hartman et al. | 714/32 |
| 7,047,518 | B2* | 5/2006 | Little et al. | 717/108 |
| 7,055,065 | B2* | 5/2006 | Farchi et al. | 714/38 |
| 7,069,536 | B2* | 6/2006 | Yaung | 717/102 |
| 7,089,534 | B2* | 8/2006 | Hartman et al. | 717/125 |
| 7,117,484 | B2* | 10/2006 | Hartman et al. | 717/126 |
| 7,200,838 | B2* | 4/2007 | Kodosky et al. | 717/116 |
| 7,246,307 | B2* | 7/2007 | Arora et al. | 715/208 |
| 7,290,245 | B2* | 10/2007 | Skjolsvold | 717/125 |
| 7,302,677 | B2* | 11/2007 | Reissman et al. | 717/135 |
| 7,337,432 | B2* | 2/2008 | Dathathraya et al. | 717/125 |
| 7,624,378 | B2* | 11/2009 | Achlioptas et al. | 717/124 |
| 7,752,502 | B2* | 7/2010 | Clee et al. | 714/38.14 |
| 7,827,532 | B2* | 11/2010 | Rosaria et al. | 717/125 |
| 2002/0091968 | A1* | 7/2002 | Moreaux et al. | 714/38 |
| 2002/0152102 | A1* | 10/2002 | Brodersen et al. | 705/7 |
| 2003/0005413 | A1* | 1/2003 | Beer et al. | 717/125 |
| 2003/0034998 | A1* | 2/2003 | Kodosky et al. | 345/736 |
| 2003/0076366 | A1* | 4/2003 | Skjolsvold | 345/855 |
| 2003/0084429 | A1* | 5/2003 | Schaefer | 717/125 |
| 2003/0208351 | A1* | 11/2003 | Hartman et al. | 703/22 |
| 2003/0233600 | A1* | 12/2003 | Hartman et al. | 714/32 |
| 2004/0225919 | A1* | 11/2004 | Reissman et al. | 714/38 |
| 2005/0033732 | A1* | 2/2005 | Chang et al. | 707/2 |
| 2005/0172270 | A1* | 8/2005 | Dathathraya et al. | 717/124 |
| 2005/0257198 | A1* | 11/2005 | Stienhans et al. | 717/124 |
| 2006/0005170 | A1* | 1/2006 | Rosaria et al. | 717/126 |
| 2006/0069782 | A1 | 3/2006 | Manning et al. | |
| 2006/0085681 | A1* | 4/2006 | Feldstein et al. | 714/25 |
| 2006/0230319 | A1* | 10/2006 | Ryali et al. | 714/38 |

OTHER PUBLICATIONS

Harry Robinson, "Intelligent Test Automation", Sep./Oct. 2000. Software Testing & Quality Engineering (STQE) magazine, pp. 23-32, retrieved from <www.harryrobinson.net/intelligent.pdf>.*

Jeffery Feldstein, "Model-Based Testing for Java and Web applications", retrieved from <http://www.sherpas.com/ModelBasedTesting.pdf>, total pp. 8.*

Fujiwara et al., "Test Selection Based on Finite State Models", IEEE Transaciions on Sofiware Engineering, vol. 17, No. 6, Jun. 1991, retrieved from <http://ieeexplore.ieee.org/stamp/stamp.jsp?tp=&arnumber=87284>, pp. 591-603.*

Paiva et al., "A Model-to-implementation Mapping Tool for Automated Model-based GUI Testing", 2005, retrieved from <http://repositorio-aberto.up.pt/bitstream/10216/7068/2/11242.pdf>, total pp. 15.*

Berger, Brian, et al., "Model Driven Testing," DNA Enterprises, inc., Mar. 1997, located on the internet at <http://www.geocities.com/model_based_testing/dna.pdf>, 4 pages.

Levy, Bob, et al., "Advancing Toward Test Automation through Effective Manual Testing," IBM Datasheet, Rational Software, May 2005, located on the internet at <http://www3.software.ibm.com/ibmdl/pub/software/rational/web/datasheets/rft.pdf>, 13 pages.

Mercury, "Mercury Winrunner," Mercury Interactive Corp., Data Sheet, 2005, located on the internet at <http://www.mercury.com/us/products/quality-center/functional-testing/winrunner/>, 2 pages.

Schwaber, Carey et al., "Evaluating Automated Functional Testing Tools," Forrester, Tech Choices, Feb. 3, 2005, 13 pages.

Telelogic, "Software development lifecycle systems testing and integration testing using TTCN-3," TAU/Tester, located on the internet at <http://www.telelogic.com/corp/products/tau/tester/overview.cfm>, 4 pages.

* cited by examiner

AUTOMATIC MODEL-BASED TESTING

FIELD OF THE INVENTION

The present invention generally relates to testing computer programs. The invention relates more specifically to automatic model-based testing.

REFERENCE TO COMPUTER PROGRAM LISTING APPENDIX ON A COMPACT DISC

Two copies of a single compact disc (Compact Disc), labeled Copy 1 and Copy 2, are hereby incorporated by reference in their entirety. Each Compact Disc contains Computer Program Listing Appendix 1. Computer Listing Appendix 1 (created on Compact Disc on May 13, 2011 and having a size of 233 KB) contains an example XML representation of an application test model.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In model-based testing of software, a test system creates and stores a finite state machine (FSM) representation of an application under test, a set of state transitions, and algorithms to navigate through the FSM and perform various tests at different points of execution of the application. The FSM representation is known as a model. IBM Rational® Functional Tester for Java™ and Web, from IBM Corporation's Rational® business unit, is one known platform that is useful for model-based testing of Web browser and Java™ applications because the scripting language is Java™. Use of Java™ as a scripting language facilitates creation of the complex data structures required to drive a model-based test.

However, a drawback of current model-based testing systems is that it is labor-intensive and time-consuming to create and maintain the data structures that drive the model or FSM. Having an automatic way to generate a model for use with a model-based testing system is desirable. IBM Rational® Functional Tester for Java™ and Web does not provide for automatically generating a model.

WINRUNNER, commercially available from MERCURY INTERACTIVE, creates and stores information about graphical user interface (GUI) elements that are generated by an application under test, known as a GUI Map. However, the scripting language of WINRUNNER lacks the power needed to create and maintain the extensive data-structures required to track and navigate an application model.

TESTMASTER, from TERADYNE, requires the user to generate the model of the application by hand. The user must draw all the states and transitions to those states. There is no support to automatically select GUI objects on the screen and associate them to proper transitions; manual work is required to associate transitions. There are no programming facilities or "hooks" for the user to program business logic and back-end tests ("verification points") to be performed at different states of the application.

A test system called TAU is commercially available from TELELOGIC. With TAU, although user can enter a graphical representation of test cases, doing so is not equivalent to a model of the application. The automated testing is procedural rather than model-based. The code generated from TAU cannot be used for GUI testing because, as with TESTMASTER, there is no GUI map to associate with a GUI test program.

Based on the foregoing, there is a clear need for methods, systems, or other means for automatically generating data associated with model-based testing of computer programs. There is a particular need for such methods, systems or other means for use with programs that generate a GUI.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
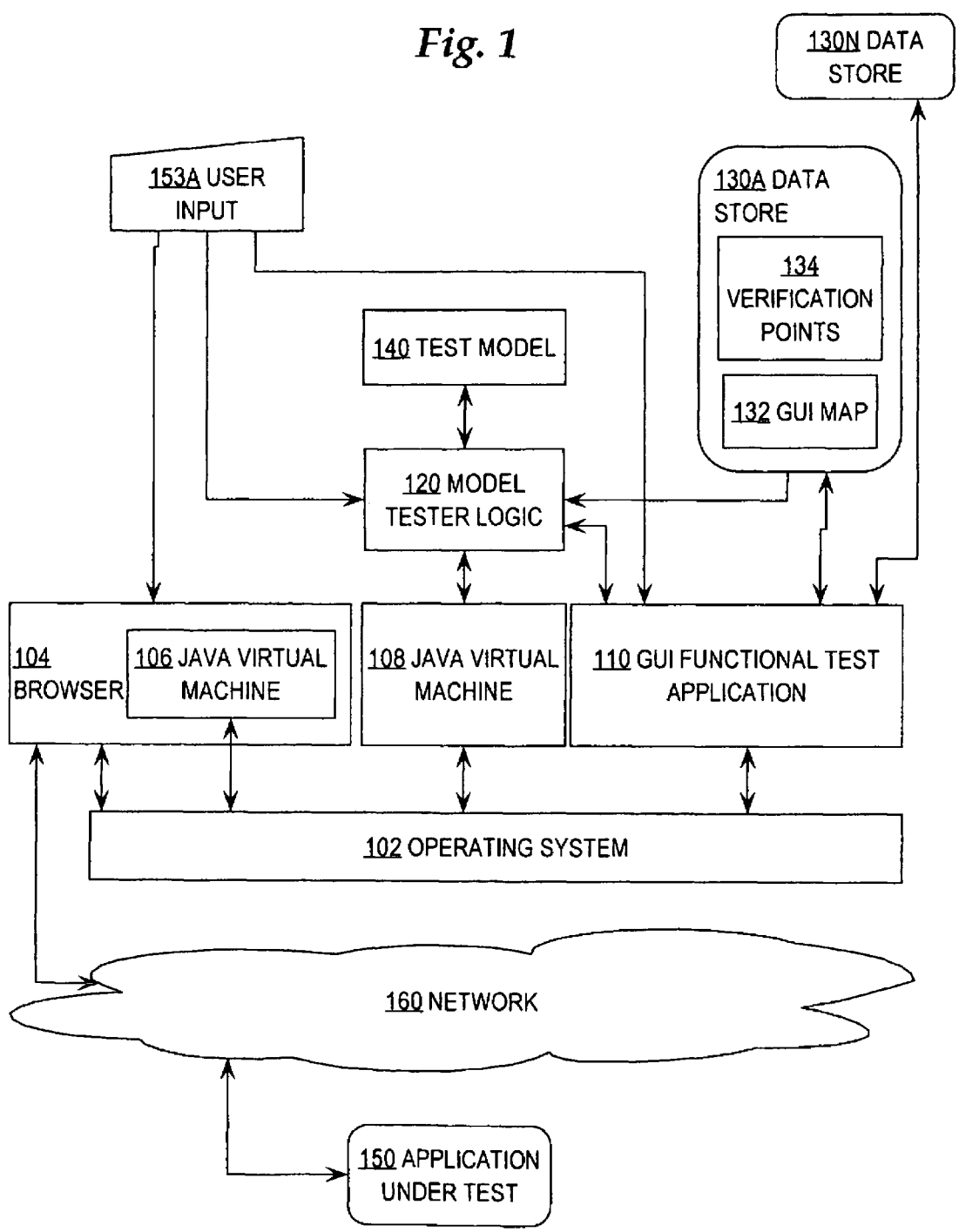
FIG. 1 is a block diagram of a system that may be used to implement an embodiment.

Techniques for automatic model-based testing are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

APPENDIX 1

Example XML Representation of Application Model

| | |
|---|---|
| 1.0 | General Overview |
| 2.0 | Structural and Functional Overview |
| 3.0 | Example Implementation of Automatic Model-Based Testing |
| 4.0 | Implementation Mechanisms-Hardware Overview |
| 5.0 | Extensions and Alternatives |

1.0 GENERAL OVERVIEW

The needs identified in the foregoing Background, and other needs and objects that will become apparent for the following description, are achieved in the present invention, which comprises, in one aspect, automatic model-based testing by receiving a set of objects associated with a computer program application under test; automatically classifying the objects as state objects representing states of the application, or transition objects representing transitions in the application from one state to another state, or static information objects; linking the state objects with the transition objects to result in creating a model in memory of all states and transitions provided by the application; associating, in the model, one or more tests with one or more of the state objects; creating and storing, based on the states and transitions, a finite state machine that represents execution behavior of the application according to the model; and testing the application by (a) automatically navigating the finite state machine and (b) providing state and transition data from the finite state machine to a graphical user interface functional test application that executes the one or more tests upon reaching the states represented by the state objects.

According to one feature, linking comprises displaying a graphical representation of the state objects; receiving user input that selects one of the state objects; displaying transition objects associated with the selected state object; receiving user input specifying graphically linking one or more of the transition objects associated with the selected state object to one or more other state objects.

In another feature, linking comprises displaying, in a graphical panel of a user interface, a first state icon representing a particular state object; displaying, in a state tree panel of the user interface, one or more transition names representing all transition objects of the application; receiving user input in the graphic user interface that selects one of the transition names and associates the selected transition name with the first state icon and a second state object; and linking, in the model, the first state object, the transition object corresponding to the selected name, and the second state object, based on the user input.

In yet another feature, the map is received from an instance of IBM Rational® Functional Tester for Java™ and Web. In still another feature, associating one or more tests comprises defining one or more verification points, and associating the verification points with states of the application under test. In a further feature, a verification point is automatically created for each of the static information objects.

Still another feature involves receiving user input selecting addition, modification or deletion of one or more states or transitions associated with application behavior that is unwanted for purposes of testing. In yet another feature, the graphical user interface functional test application is IBM Rational® Functional Tester for Java™ and Web or MERCURY INTERACTIVE WINRUNNER. In another feature, the computer program application under test is a Java™ application or hypertext mark-up language ("HTML") based Web application.

In a related feature, the computer program application under test is a Microsoft® Windows® application, and wherein the testing step comprises testing the application by (a) automatically navigating the finite state machine and (b) calling Windows® API functions using the state and transition data from the finite state machine to execute the one or more tests upon reaching the states represented by the state objects. In still another feature, the computer program application under test is a LINUX XWindows application.

According to another feature, the method further involves creating and storing one or more data stores, wherein each of the data stores comprises a stored association of (a) a set of objects associated with of a computer program application under test, (b) a computer program application under test, and (c) computer program code for the one or more tests.

In other aspects, the invention encompasses a computer apparatus and a computer-readable medium configured to carry out the foregoing steps.

2.0 STRUCTURAL AND FUNCTIONAL OVERVIEW

Generally, in one embodiment of a method for automatic model-based testing as described herein, information representing all states of an application is automatically generated programmatically by analyzing a graphical user interface (GUI) map that is generated by a GUI functional test application. In this context, a state corresponds to a screen, link or URL, Java™ application or the equivalent, or other element that is displayed or provided by an application under test or under development. Each state may be stored using an object representation in a test model, in which each state object further comprises metadata such as a state name, a Boolean value indicating whether the state has been visited as part of testing, etc.

A user establishes state transitions by associating a GUI object representing a first state with another GUI object representing another state. For example, a user selects a button labeled "search" and points the button to a "search" dialog box. Transitions, in this context, include standard browser buttons or selectable or clickable elements, such as GUI widgets, that are provided by an application. Each transition comprises a trigger action, such as selecting a particular widget or element, and a destination state to which a program transition occurs in response to the trigger action. The user also supplies program logic that verifies that the application took the correct action, such as transitioning to the correct state, and verifying that the logic was correctly executed. In one embodiment, the user is presented with a choice of application navigation algorithms that are executed automatically.

This approach generates a model for an application and executes the generated model-based test. A large savings in time is achieved, because the approach automatically generates and maintains the complex and large data structures that comprise the application finite state machine or model.

FIG. 1 is a block diagram of a system that may be used to implement an embodiment. An application under test 150 (also referred to herein as application 150) is communicatively coupled to a network 160. A test system 101 hosts an operating system 102, a browser 104, a Java™ application 108, and a GUI functional test application 110. In one embodiment, browser 104 hosts a separate Java™ virtual machine 106 and can execute Java™ code within that virtual machine. In one embodiment, GUI functional test application 110 comprises IBM Rational® Functional Tester for Java™ and Web from IBM Corporation.

Model tester logic 120 is communicatively coupled to Java™ application 108 and GUI functional test application 110. The functions of model tester logic 120 are described further herein. Model tester logic 120 interacts with a test model 140 and a data store 130A that comprises a GUI map 132 and verification points 134. In an embodiment, any number of data stores 130A, 130N may be used, each having separate verification points and GUI maps. GUI functional test application 110 and browser 104 may receive user input 153A from any suitable user input device such as a terminal, personal computer, workstation, etc.

Figure 2:
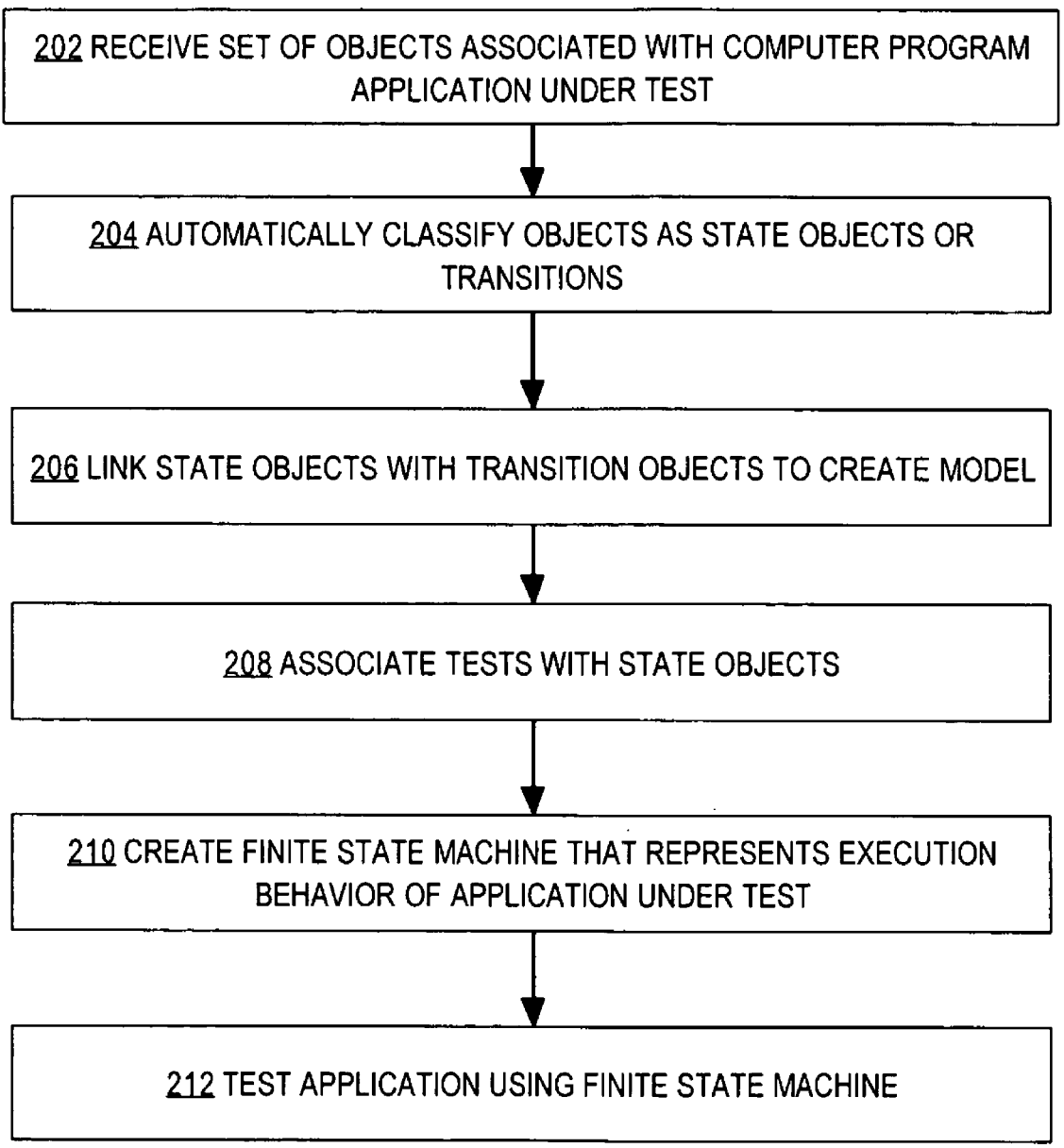
FIG. 2 is a flow diagram that illustrates a high level overview of one embodiment of a method for automatic model-based testing.

FIG. 2 is a flow diagram that illustrates a high level overview of one embodiment of a method for automatic model-based testing. For purposes of illustrating a clear example, FIG. 2 is described with reference to the system of FIG. 1. However, the general techniques of FIG. 2 may be used with other systems and in other implementations.

At step 202, a set of objects associated with a computer program under test is received. For example, the model tester logic 120 retrieves the GUI map 132 from storage in data store 130A, after the GUI functional test application 110 has created the GUI map based on obtaining information about states, transitions and static screen data generated by the application under test 150.

In step 204, the objects are automatically classified as state objects or transitions. In one embodiment, step 204 may be performed by comparing the name of a particular object in the GUI map 132 to a table or mapping that defines which objects are state objects.

In step 206, the state objects are linked with transition objects to result in creating a model of the execution behavior of the application under test. As an example, step 206 can involve receiving user input to drag and drop icons representing stage objects and transitions in a graphical workspace until a graphical diagram of the execution behavior of the application under test is made. The graphical workspace is provided by model tester logic 120. As a result, test model 140 is created and stored.

In step 208, one or more tests are associated with state objects. The tests define how to determine whether the application under test 150 correctly displayed information or objects when a particular state, represented by a state object, is reached. The tests may be defined as verification points 134 that are compatible with GUI functional test application 110.

In step 210, a finite state machine that represents the execution behavior of the application under test is created. In one embodiment, the finite state machine is represented in and stored in the test model 140. In step 212, the application is tested using the finite state machine. In one embodiment, the finite state machine drives operation of the GUI functional test application 110. The GUI functional test application 110 launches the application under test 150 and issues simulated mouse clicks or other simulated user input to result in navigating among states and transitions of the application under test. As states are reached, the tests associated in the model 140 with the states are performed.

Figure 3A:
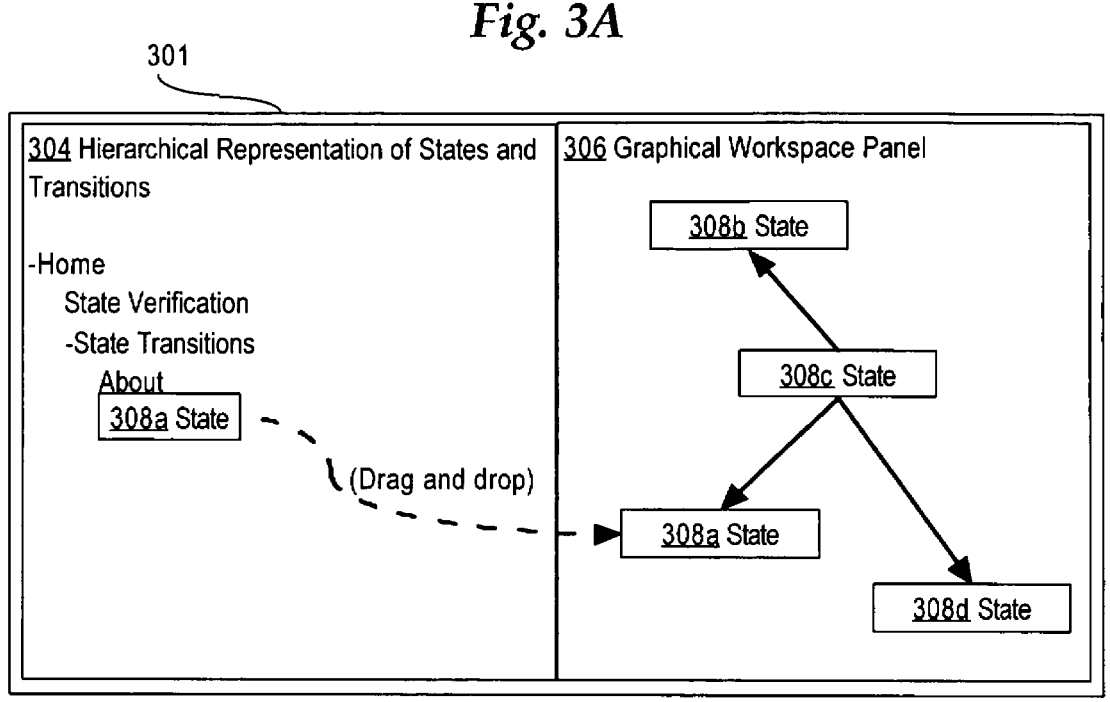
FIG. 3A is a block diagram of an example screen display that may be used in an implementation.

FIG. 3A is a block diagram of an example screen display that may be used in an implementation of the techniques of FIG. 2. In FIG. 3A, a screen display 301 comprises a hierarchical representation 304 of states and transitions and a graphical workspace panel 306. In one embodiment, after step 204, the hierarchical representation 304 is created and displayed in screen display 301. The hierarchical representation 304 presents a list of all state objects and transitions as derived from the GUI map or other data source. States that are identified in or linked to another state are shown as nested below that other state. For example, if the application under test 150 comprises a Home page that displays Create, Edit, and Delete functions for a particular kind of data, then the hierarchical representation 304 specifies a Home object, and Create, Edit, and Delete objects are shown nested below the Home object.

With screen display 301, step 206 of FIG. 2 may be implemented in several ways. In one approach, after step 204, the process of FIG. 2 automatically displays all states in the graphical workspace panel 306, connected by lines or arrows representing transitions, based on the hierarchical representation show in panel 304. Thereafter, a user may modify the graphical representation of states and transitions. For example, the user may select a particular state 308b and move it to a different position in graphical workspace panel 306. The user may select a transition and drag the transition so that it joins one or more different objects.

In another approach, a user may manually create a graphical map of the states and transitions by dragging one or more states from the hierarchical representation and dropping them into graphical workspace panel 306. For example, state 308a is selected using a mouse or other pointing device and dragged into graphical workspace panel 306. The state is then joined to another state 308c that was previously dragged into the workspace panel 306. The user repeats such drag-and-drop operations until a complete graphical map of all states and transitions is constructed in the graphical workspace panel 306. This approach may be used for a simpler implementation in which model tester logic 120 does not automatically identify transitions.

Figure 3B:
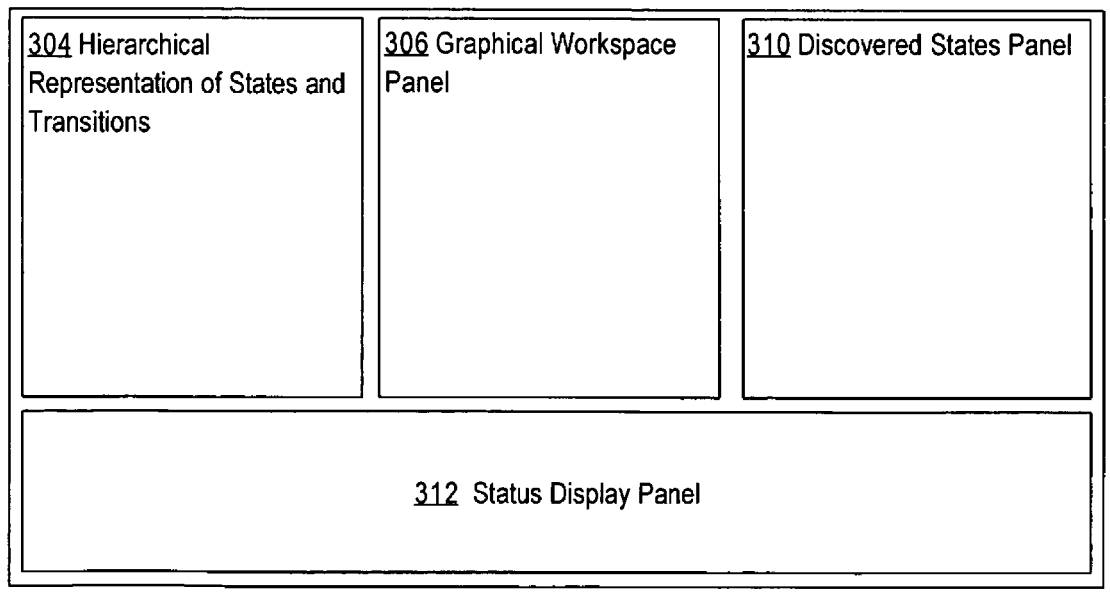
FIG. 3B is a block diagram of another example screen display.

FIG. 3B is a block diagram of another example screen display. In the example of FIG. 3B, a screen display comprises panels 304, 306 as in FIG. 3A. FIG. 3B further comprises a discovered states panel 310 and a status display panel 312. The discovered states panel 310 displays the contents of the GUI map 132 as retrieved from data store 130A, without automatic classification into state objects and transition objects. The status display panel 312 displays text messages indicating what the components of the system are doing. For example, status display panel 312 displays information indicating that each of the steps of FIG. 2 has been performed or is being performed. The information shown in status display panel 312 may assist a user in determining whether model tester logic 120 and GUI functional test application 110 are performing correctly.

3.0 EXAMPLE IMPLEMENTATION OF AUTOMATIC MODEL-BASED TESTING

Figure 4A:
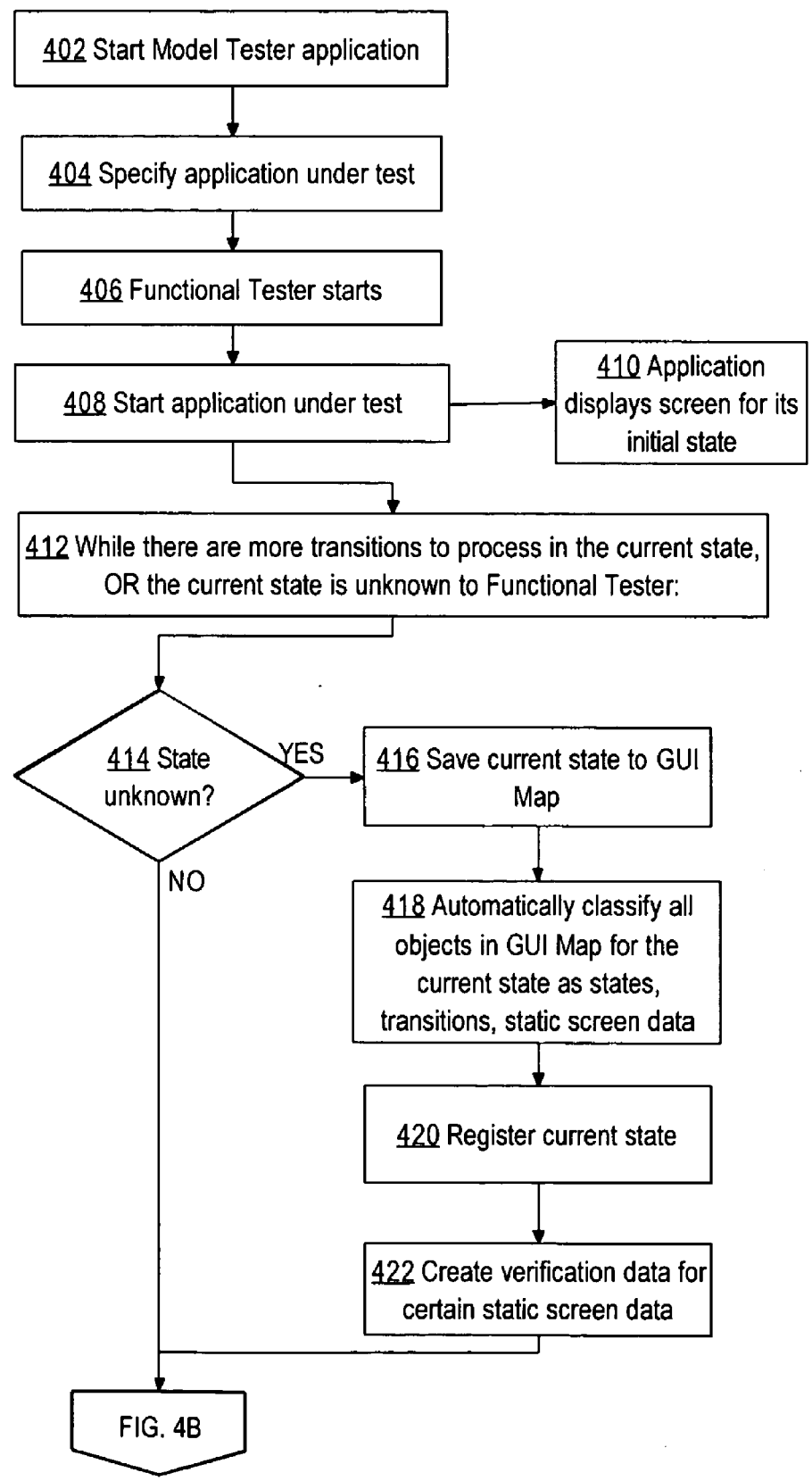
FIG. 4A, FIG. 4B, and FIG. 4C are flow diagrams of another embodiment of a method of automatic model-based testing.
Figure 4B:
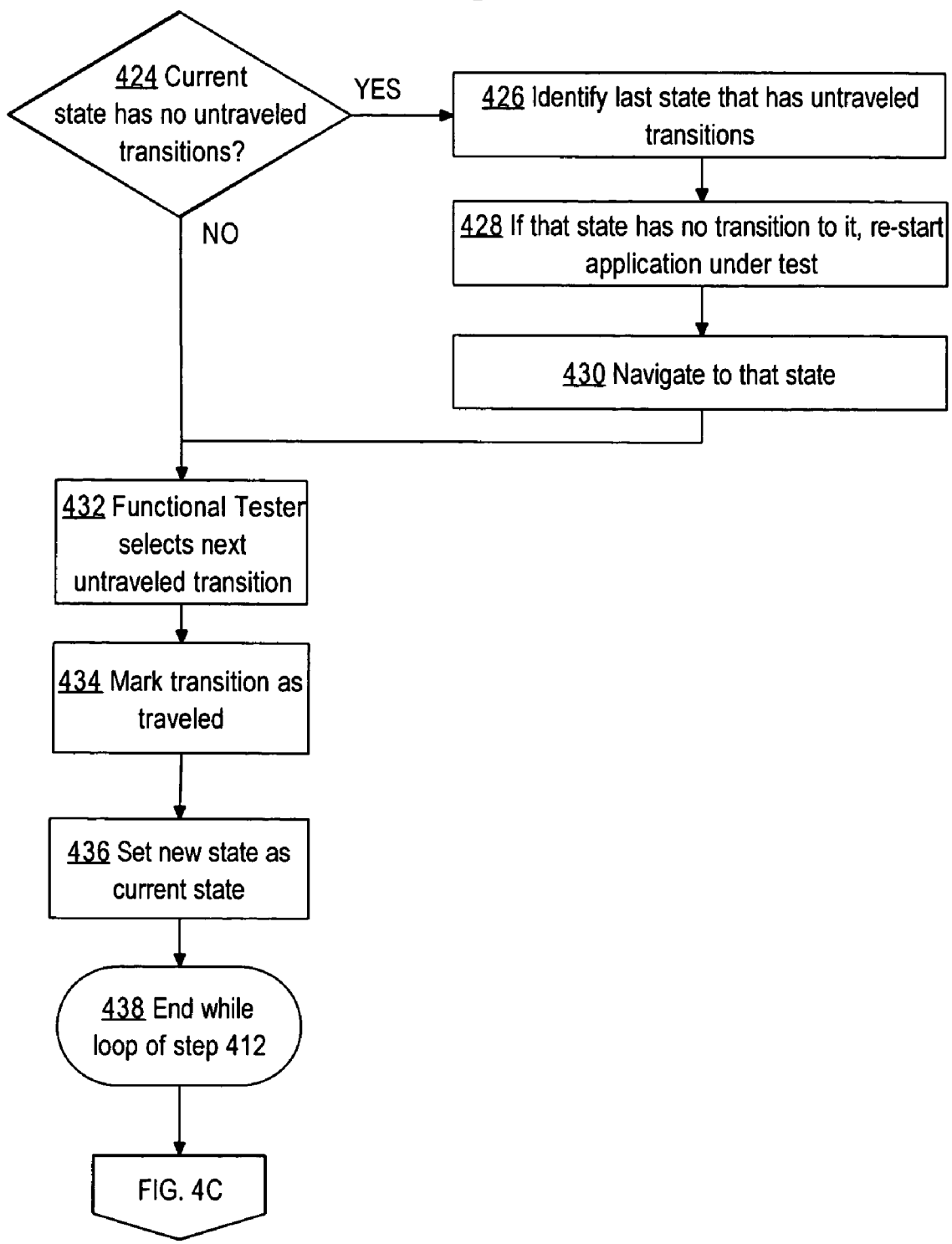
Figure 4C:
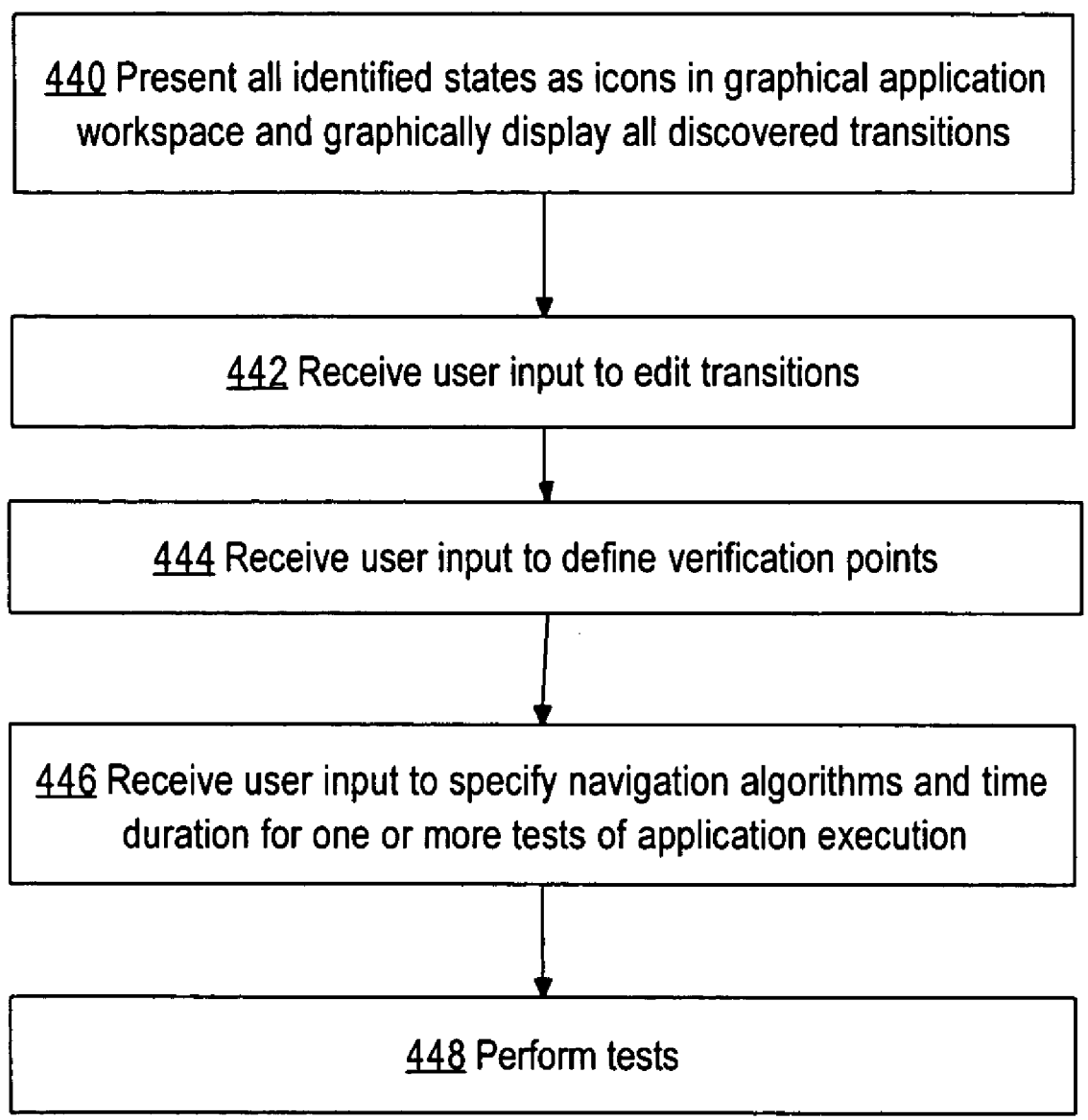
Figure 5:
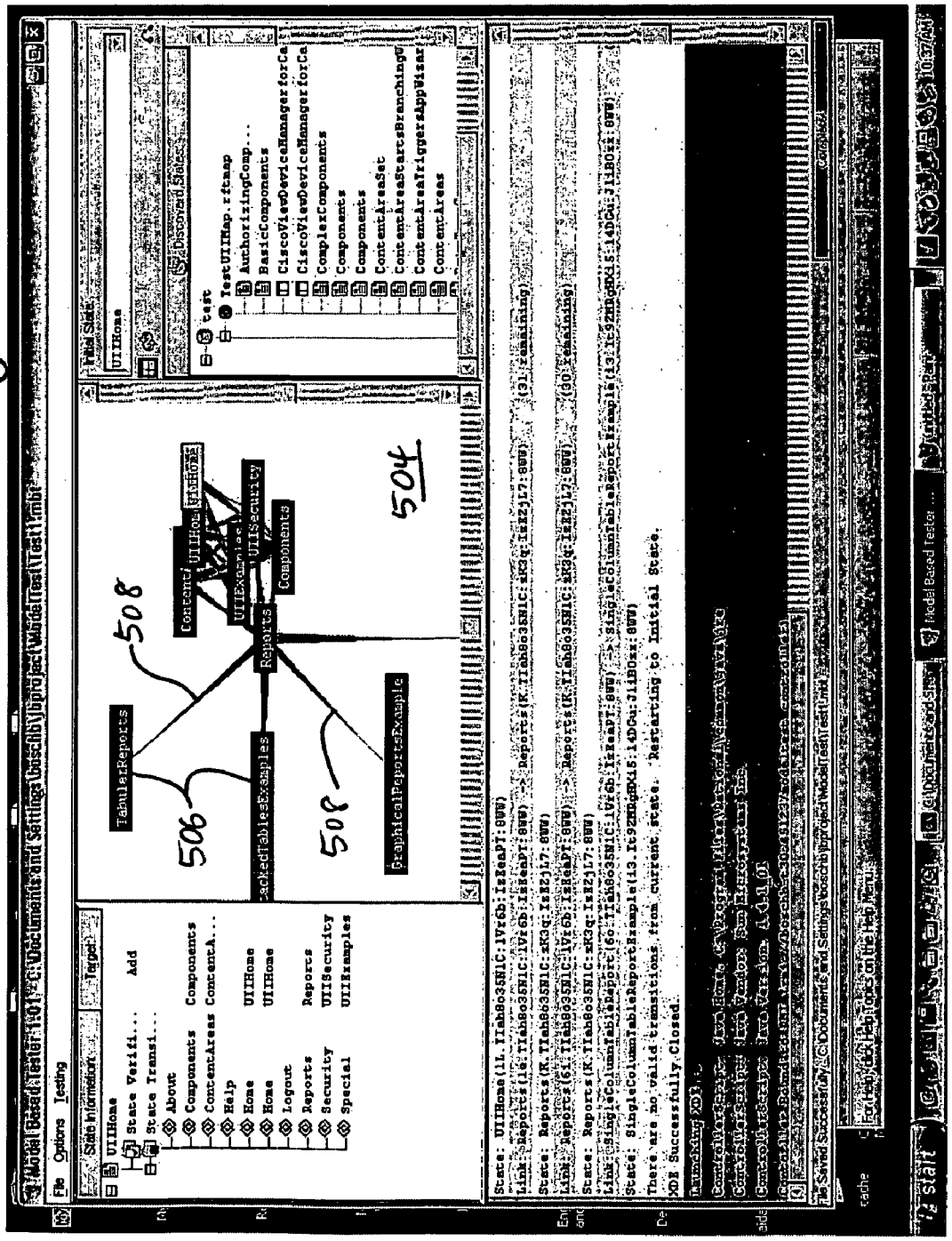
FIG. 5 is a screen capture diagram showing another example screen display.

FIG. 4A, FIG. 4B, and FIG. 4C are flow diagrams of another embodiment of a method of automatic model-based testing. FIG. 5 is a screen capture diagram showing another example screen display. For purposes of illustrating a clear example, FIG. 4A, FIG. 4B, FIG. 4C, and FIG. 5 are described together and with reference to the system of FIG. 1.

In step 402, a Model Tester application starts. In an embodiment, the Model Tester application is a computer program that implements model tester logic 120 and certain functional steps described herein.

In step 404, the application under test is specified. In one embodiment, user input is received that specifies a command line or Uniform Resource Locator (URL) for starting up the application under test. The command line may invoke the application, or a URL for a home page of the application is specified. Step 404 also may involve selecting a data store 130A and loading a GUI map 132 corresponding to the application under test.

In response, in step 406, the model tester logic 120 starts or invokes the GUI functional test application 110. In one embodiment, the Model Tester application starts IBM Rational Functional Tester for Java and Web. Remote method invocation (RMI) techniques may be used for the model tester logic 120 to access functions of the GUI functional test application 110. For example, when testing is performed in later steps of FIG. 4c, the Model Tester application uses RMI to invoke methods of IBM Rational® Functional Tester to cause it to click links of the application under test and perform other functions.

In step 408, the application under test starts. In one embodiment, model tester logic 120 commands the functional test application 110 to start the application under test 150. The application under test 150 initiates execution and displays its initial screen, representing its start-up state, on a graphical display device.

At step 412 a programmatic "while . . . do" loop begins, in which steps 414 through 438, inclusive, are performed while there are more transitions to process in the current state, or while the current state is unknown to the GUI functional test application 110. A particular state is unknown if execution of the application under test 150 reaches that state, and the state is not represented in the GUI map 132. If the current state is unknown to the GUI functional test application 110, as shown in step 414, then control transfers to step 416 in which the current state is saved into the GUI map 132. The state may be saved by calling an API function of the GUI functional test application 110, for example. In the case of IBM Rational® Functional Tester, the API to save the current state is not published, but is available to use for purposes of step 416.

At step 418, all objects in the GUI map associated with the new state are automatically classified as states, transitions, or static screen data. In one embodiment in which GUI functional test application 110 is IBM Rational® Functional Tester for Java™ and Web, model tester logic 120 passes through the entire GUI map 132 for the new state, classifying each object as one of the following: Objects that represent another state, including, for example, HTML documents, applet pages, message boxes and dialog boxes; transitions to another state, such as buttons, menus, and tabs; or static screen data. Information identifying the states, transitions, and static screen data is stored in the test model 140 after the automatic classification is completed. An example test model, represented in Extensible Markup Language (XML), is set forth in Appendix 1.

When the application under test is a Java or browser-based Web application, automatic classification of objects in step 418 may be performed by comparing Java classes that define each object in the GUI map to one or more class lists that define states, transitions, and static screen information. For non-Java application, other forms of lookup tables may be used to automatically classify objects.

In an alternative embodiment, the GUI functional test application 110 may be MERCURY INTERACTIVE's WINRUNNER. WINRUNNER and certain other GUI test systems do not provide an interface to a GUI map 132. If such an interface is not available, then model tester logic 120 prompts the user to "manually learn this state and click OK to continue". In this approach, manually learning a state involves the user selecting the "learn object tool", highlighting the new, unknown window and clicking "save". The model tester logic 120 then re-reads the GUI object map, finds the new state just added to the map, and continues as further described herein.

In step 420, the current state is registered with the model tester logic 120. Registration involves storing state information so that it can be referenced in subsequent steps. The state information may be stored in any convenient form including memory data structures, a database, etc.

In step 422, verification data is created for certain static screen data. In one embodiment, verification points are automatically created for labels, text areas and any kind of text or image that is not in an editable field. Information identifying the verification points is stored in the test model 140.

Upon completion of steps 416-422, a previously unknown state is now known and registered with the model tester logic 120 and is stored in the test model 140.

Referring now to FIG. 4B, at step 424 a test is performed to determine if the current state has no untraveled transitions. If so, then in step 426, the last state of the application under test that has untraveled transitions is identified. For example, recursive calls that are used to implement the process of FIG. 4A, FIG. 4B unwind to the last state that has untraveled transitions. For the state identified at step 426, if a transition path does not exist to that state, then the application is restarted at step 428. Otherwise, at step 430, the model test logic navigates to that state.

At step 432, the GUI functional test application 110 selects the next untraveled transition. For example, IBM Rational Functional Tester travels or clicks on the next untraveled transition in the current state. At step 434, the model tester logic 120 marks the transition destination as traveled. The marking is stored in the test model 140. At step 436, the new state reached through the transition is set as the current step. Step 438 represents the end of the while loop that initiated at step 412.

Referring now to FIG. 4C, at step 440, each state that has been identified in the process of FIG. 4A, FIG. 4B is presented to the user as an icon in a graphical application workspace. All discovered transitions are displayed or drawn in the graphical application workspace so that a graphical map of states and transitions is created. For example, referring to FIG. 5, a screen display 502 comprises a graphical application workspace 504 that displays one or more state objects 506 and transitions 508. The transitions 508 interconnect the state objects 506 and thereby indicate how a user could move from one state of the application under test to another state by selecting a user interface widget provided by the application such as a button or link.

At step 442, user input to edit transitions is received. Step 442 is optional, and is performed only if a user wishes to manually edit the transitions between states. Editing transitions among states may be performed to account for parts of the application that should not be in the model, parts of the application where the desired behavior has changed, etc. If the user input changes the connection of a transition to particular states, information identifying how the states are connected by transitions as a result of the editing is stored in the test model 140. Thus, the test model 140 is maintained consistent with the graphical representation of states and transitions in the application workspace 504.

At step 444, user input to define verification points is received. In one embodiment, the user of the model tester logic 120 defines one or more verification points using the GUI functional test application 110. Each of the verification points defines one or more tests of the semantics or logic of a particular state. When associated with a state, the tests are executed when the GUI functional test application 110 reaches the given state, as further described below. As verification points are defined, information identifying the verification points is stored in the test model 140. As a result, the test model 140 contains a complete object-based representation of states, transitions, and static screen data of the application under test 150, and tests to be performed on the application under test.

At step 448, one or more tests are performed. For example, the user can begin executing tests by selecting tests from a list of navigation algorithms and time durations. The navigation algorithms define how the GUI functional test application 110 should navigate among states of the application under test 150 and perform tests. Examples of navigation algorithms that can be selected include random navigation, random navigation with no repeat visits to a particular state until all states have been visited, depth-first navigation, breadth-first navigation, and user-defined navigation. A specified time duration may be selected. Alternatively, tests may be run continuously, i.e., for an indefinite time.

Testing the application under test 150 begins under control of model tester logic 120 and GUI functional test application 110. In one embodiment, a Model Tester application drives operation of IBM Rational® Functional Tester based on the test model 140. For example, assume that random navigation is selected as part of step 448. The model tester logic 120 randomly selects, from the test model 140, a transition from the current state, and calls GUI functional test application 110 to execute a click method on the selected transition. The GUI functional test application 110 invokes functions of Java application 108 or browser 104 to programmatically click on the selected transition. The application under test 150 performs the action that has been programmed into it for the selected transition. As a result, the application under test 150 reaches a new state. The model tester logic 120 checks the test model 140 to determine whether a verification point is associated with the prior state. If so, the verification point is executed. As an example, the verification point may comprise a test that determines whether the application under test 150 reached the correct new state as a result of performing the selected transition.

In one embodiment, model tester logic 120 continues to display the screen display of FIG. 5 as the application under test is tested. Each state object and transition may be displayed using a color. As the GUI functional test application 110 navigates to various states of the application and performs tests, the color of states and transitions change. For example, green links are transitions that have been visited and blue links are transitions that are not yet visited.

The techniques described herein can be used for any GUI application that provides a programming interface or API that provides calls to examine screen objects. Such an interface may be part of an operating system or part of a specific application. For example, the techniques herein can be used with Microsoft Windows® or X11 applications using appropriate program calls to native API functions that are provided with Windows® and X11. For Windows®, the structure of the GUI map is published and access is available through the Windows® native API. Therefore, examining properties of a current state can be performed by navigating the object tree for that state. If a GUI application is developed without using operating system programming interfaces, then object-interrogation functions may be provided as part of the application.

In still another embodiment, model tester logic 120 and GUI functional test application 110 may be integrated as one software element. This alternative is appropriate for testing Windows® applications in which functions of the Windows® native API are called to generate an object representation equivalent to a GUI map.

According, as described herein for one embodiment, automatic generation, navigation and model-based test execution of a model for Java™ and Web-based applications is provided. The techniques described herein eliminate the laborious task of hand-coding and maintaining large, complex data structures required to execute model-based tests. Further, none of the prior art above has the ability to automatically create and maintain a finite state machine or model of an application under test; automatically create a list of possible states and associated transition objects by examining a GUI map; automatically navigate the model, thereby performing a model-based test through a variety of navigation algorithms; and provide a way for defining application logic verification points.

4.0 IMPLEMENTATION MECHANISMS

Hardware Overview

Figure 6:
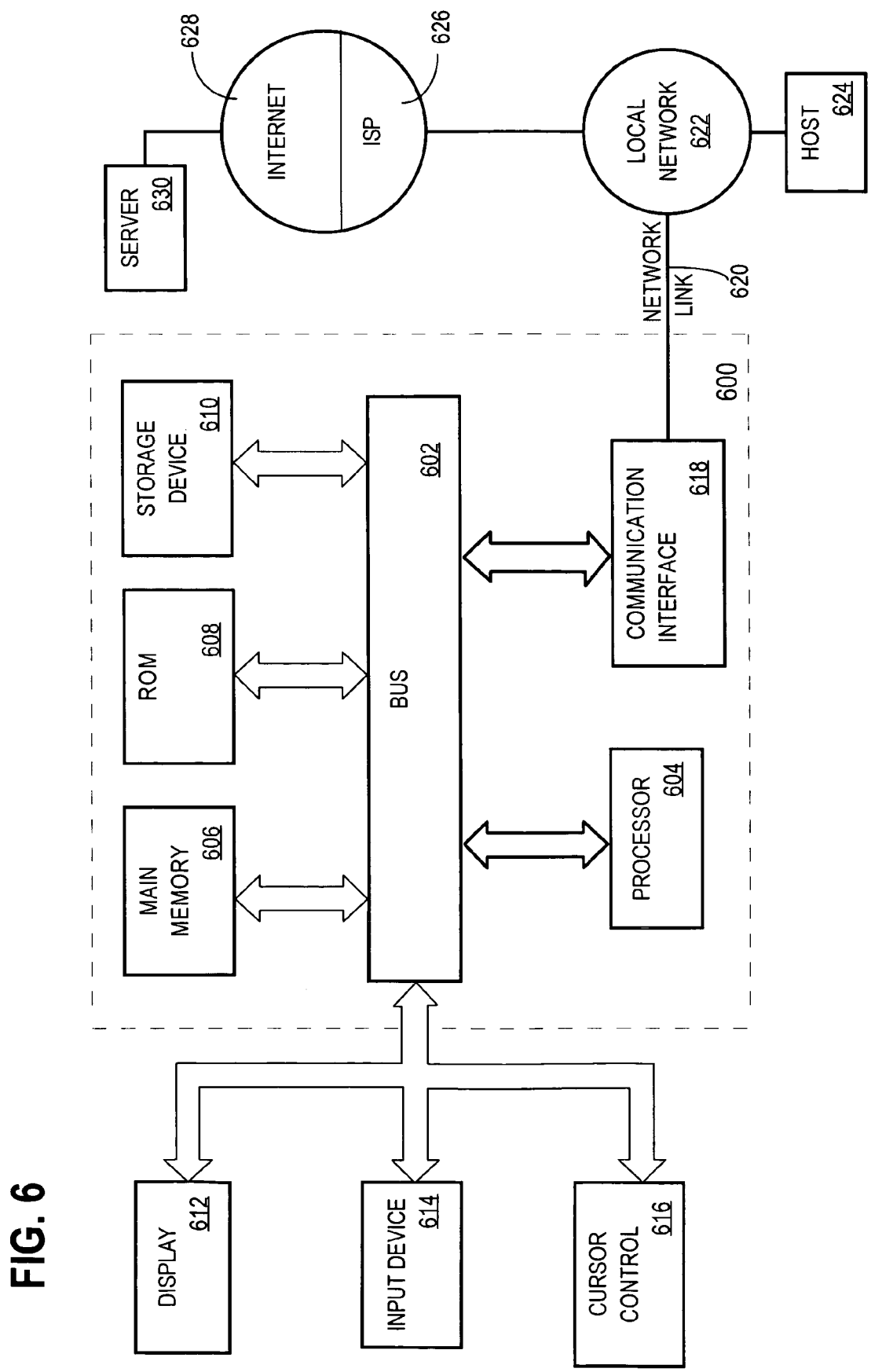
FIG. 6 is a block diagram that illustrates a computer system upon which an embodiment may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory ("RAM") or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory ("ROM") 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube ("CRT"), for displaying information to a computer user. An input device 614, including alphanumeric and other keys, is coupled to bus 602 for communicating information and command selections to processor 604. Another type of user input device is cursor control 616, such as a mouse, trackball, stylus, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for automatic model-based testing. According to one embodiment of the invention, automatic model-based testing is provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector can receive the data carried in the infrared signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network ("ISDN") card or a modem to provide a data communication connection to a corresponding type of telephone line. As another example, communication interface 618 may be a local area network ("LAN") card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider ("ISP") 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application provides for automatic model-based testing as described herein.

The received code may be executed by processor 604 as it is received, and/or stored in storage device 610, or other non-volatile storage for later execution. In this manner, computer system 600 may obtain application code in the form of a carrier wave.

5.0 EXTENSIONS AND ALTERNATIVES

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method, comprising the computer-implemented steps of:
receiving a set of objects associated with a computer program application under test;
prior to testing the application, automatically classifying the objects as state objects representing states of the application, or transition objects representing transitions in the application from one state to another state, or static information objects;
linking the state objects with the transition objects to result in creating a model in memory of all states and transitions provided by the application;
associating, in the model, one or more tests with one or more of the state objects;
creating and storing, based on the states and transitions, a finite state machine that represents execution behavior of the application according to the model;
selecting a set of states or transitions associated with application behavior that is unwanted for testing;
testing the application by (a) automatically navigating the states and transitions of the finite state machine which are not in the set of states or transitions that are unwanted for testing and (b) providing state and transition data from the finite state machine to a graphical user interface functional test application that executes the one or more tests upon reaching the states represented by the state objects;
wherein the set of objects are graphical user interface (GUI) objects and the automatically classifying comprises analyzing a GUI map;
wherein the GUI map stores information about elements generated by the application based at least in part on information about states of the application, transitions in the application from one state to another state, or static information objects;
wherein the method is performed by one or more computing devices.

2. A method as recited in claim 1, wherein linking comprises:
displaying a graphical representation of the state objects;
receiving user input that selects one of the state objects;
displaying transition objects associated with the selected state object;
receiving user input specifying graphically linking one or more of the transition objects associated with the selected state object to one or more other state objects.

3. A method as recited in claim 1, wherein linking comprises:
displaying, in a graphical panel of a user interface, a first state icon representing a particular state object;
displaying, in a state tree panel of the user interface, one or more transition names representing all transition objects of the application;
receiving user input in the graphic user interface that selects one of the transition names and associates the selected transition name with the first state icon and a second state object; and
linking, in the model, the first state object, the transition object corresponding to the selected name, and the second state object, based on the user input.

4. A method as recited in claim 3, further comprising receiving user input selecting addition or modification of one or more states or transitions associated with application behavior that is unwanted for purposes of testing.

5. A method as recited in claim 1, wherein associating one or more tests comprises defining one or more verification points, and associating the verification points with states of the application under test.

6. A method as recited in claim 5, further comprising automatically creating a verification point for each of the static information objects.

7. A method as recited in claim 1, wherein the computer program application under test is a hyper text mark-up language-based Web application.

8. A method as recited in claim 1, wherein the computer program application under test is an operating system application, and wherein the testing step comprises testing the application by (a) automatically navigating the finite state machine and (b) calling operating system application program interface functions using the state and transition data from the finite state machine to execute the one or more tests upon reaching the states represented by the state objects.

9. A method as recited in claim 1, further comprising creating and storing one or more data stores, wherein each of the data stores comprises a stored association of (a) a set of objects associated with of a computer program application under test, (b) a computer program application under test, and (c) computer program code for the one or more tests.

10. A method, comprising the computer-implemented steps of:
receiving a set of objects associated with a computer program application under test;
prior to testing the application, automatically classifying the objects as state objects representing states of the application, or transition objects representing transitions in the application from one state to another state, or static information objects;
creating and displaying a graphical user interface of a model-based test application, wherein the graphical user interface comprises a state information panel and a graphical workspace panel;
displaying, in the state information panel, a hierarchical representation of the state objects and the transition objects, wherein the hierarchical representation corresponds to an organization of the states and transitions of the application;
displaying, in the graphical workspace panel, state icons representing the state objects;
linking the state objects with the transition objects in response to user input in the graphical workspace panel;
creating and storing, based on the states and transitions, a finite state machine that represents execution behavior of the application according to the model;
wherein the set of objects are graphical user interface (GUI) objects and the automatically classifying comprises analyzing a GUI map;
wherein the GUI map stores information about elements generated by the application based at least in part on information about states of the application, transitions in the application from one state to another state, or static information objects;
associating, in the model, one or more tests with one or more of the state objects;
selecting a set of states or transitions associated with application behavior that is unwanted for testing;
testing the application by (a) automatically navigating the states and transitions of the finite state machine which are not in the set of states or transitions that are unwanted for testing and (b) providing state and transition data from the finite state machine to a graphical user interface functional test application that executes the one or more tests upon reaching the states represented by the state objects;
wherein the method is performed by one or more computing devices.

11. A computer-readable volatile or non-volatile, non-transitory medium comprising one or more stored sequences of instructions which, when executed by one or more processors, cause the one or more processors to perform the steps of:
receiving a set of objects associated with a computer program application under test;
prior to testing the application, automatically classifying the objects as state objects representing states of the application, or transition objects representing transitions in the application from one state to another state, or static information objects;
linking the state objects with the transition objects to result in creating a model in memory of all states and transitions provided by the application;
associating, in the model, one or more tests with one or more of the state objects;
creating and storing, based on the states and transitions, a finite state machine that represents execution behavior of the application according to the model;
selecting a set of states or transitions associated with application behavior that is unwanted for testing;
testing the application by (a) automatically navigating the states and transitions of the finite state machine which are not in the set of states or transitions that are unwanted for testing and (b) providing state and transition data from the finite state machine to a graphical user interface functional test application that executes the one or more tests upon reaching the states represented by the state objects;
wherein the set of objects are graphical user interface (GUI) objects and the automatically classifying comprises analyzing a GUI map;
wherein the GUI map stores information about elements generated by the application based at least in part on information about states of the application, transitions in the application from one state to another state, or static information objects;
wherein the method is performed by one or more computing devices.

12. A computer-readable volatile or non-volatile, non-transitory medium as recited in claim 11, wherein the instructions for performing linking comprise instructions which, when executed by the one or more processors, cause the one or more processors to perform the steps of:
displaying a graphical representation of the state objects;
receiving user input that selects one of the state objects;
displaying transition objects associated with the selected state object;
receiving user input specifying graphically linking one or more of the transition objects associated with the selected state object to one or more other state objects.

13. A computer-readable volatile or non-volatile, non-transitory medium as recited in claim 11, wherein the instructions for performing linking comprise instructions which, when executed by the one or more processors, cause the one or more processors to perform the steps of:
displaying, in a graphical panel of a user interface, a first state icon representing a particular state object;
displaying, in a state tree panel of the user interface, one or more transition names representing all transition objects of the application;
receiving user input in the graphic user interface that selects one of the transition names and associates the selected transition name with the first state icon and a second state object; and
linking, in the model, the first state object, the transition object corresponding to the selected name, and the second state object, based on the user input.

14. A computer-readable volatile or non-volatile, non-transitory medium as recited in claim 13, further comprising instructions which, when executed by the one or more processors, cause the one or more processors to perform the steps of receiving user input selecting addition or modification of one or more states or transitions associated with application behavior that is unwanted for purposes of testing.

15. A computer-readable volatile or non-volatile, non-transitory medium as recited in claim 11, wherein the instructions for associating one or more tests comprise instructions which, when executed by the one or more processors, cause the one or more processors to perform the steps of defining one or more verification points, and associating the verification points with states of the application under test.

16. A computer-readable volatile or non-volatile, non-transitory medium as recited in claim 15, further comprising instructions which, when executed by the one or more processors, cause the one or more processors to perform the steps of automatically creating a verification point for each of the static information objects.

17. A computer-readable volatile or non-volatile, non-transitory medium as recited in claim 11, wherein the computer program application under test is a hyper text mark-up language-based Web application.

18. A computer-readable volatile or non-volatile, non-transitory medium as recited in claim 11, wherein the computer program application under test is a an operating system application, and wherein the instructions for testing further comprise instructions which, when executed by the one or more processors, cause the one or more processors to perform the steps of testing the application by (a) automatically navigating the finite state machine and (b) calling operating system application program interface functions using the state and transition data from the finite state machine to execute the one or more tests upon reaching the states represented by the state objects.

19. A computer-readable volatile or non-volatile, non-transitory medium as recited in claim 11, further comprising instructions which, when executed by the one or more processors, cause the one or more processors to perform the steps of creating and storing one or more data stores, wherein each of the data stores comprises a stored association of (a) a set of objects associated with of a computer program application under test, (b) a computer program application under test, and (c) computer program code for the one or more tests.

20. An apparatus, comprising:
one or more processors;
means for receiving a set of objects associated with a computer
program application under test;
means for automatically classifying, prior to testing the application, the objects as state objects representing states of the application, or transition objects representing transitions in the application from one state to another state, or static information objects;
means for linking the state objects with the transition objects to result in creating a model in memory of all states and transitions provided by the application;
means for associating, in the model, one or more tests with one or more of the state objects;
means for creating and storing, based on the states and transitions, a finite state machine that represents execution behavior of the application according to the model;
means for selecting a set of states or transitions associated with application behavior that is unwanted for testing;
means for testing the application by (a) automatically navigating the states and transitions of the finite state machine which are not in the set of states or transitions that are unwanted for testing and (b) providing state and transition data from the finite state machine to a graphical user interface functional test application that executes the one or more tests upon reaching the states represented by the state objects;
wherein the set of objects are graphical user interface (GUI) objects and the automatically classifying comprises analyzing a GUI map;
wherein the GUI map stores information about elements generated by the application based at least in part on information about states of the application, transitions in the application from one state to another state, or static information objects.

21. An apparatus as recited in claim 20, wherein the means for linking comprises:
means for displaying a graphical representation of the state objects;
means for receiving user input that selects one of the state objects;
means for displaying transition objects associated with the selected state object;
means for receiving user input specifying graphically linking one or more of the transition objects associated with the selected state object to one or more other state objects.

22. An apparatus as recited in claim 20, wherein the means for linking comprises:
means for displaying, in a graphical panel of a user interface, a first state icon representing a particular state object;
means for displaying, in a state tree panel of the user interface, one or more transition names representing all transition objects of the application;
means for receiving user input in the graphic user interface that selects one of the transition names and associates the selected transition name with the first state icon and a second state object; and
means for linking, in the model, the first state object, the transition object corresponding to the selected name, and the second state object, based on the user input.

23. An apparatus as recited in claim 22, further comprising means for receiving user input selecting addition or modification of one or more states or transitions associated with application behavior that is unwanted for purposes of testing.

24. An apparatus as recited in claim 20, wherein the means for associating one or more tests comprises means for defining one or more verification points, and means for associating the verification points with states of the application under test.

25. An apparatus as recited in claim 24, further comprising means for automatically creating a verification point for each of the static information objects.

26. An apparatus as recited in claim 20, wherein the computer program application under test is a hyper text mark-up language-based Web application.

27. An apparatus as recited in claim 20, wherein the computer program application under test is an operating system application, and wherein the means for testing comprises means for testing the application by (a) automatically navigating the finite state machine and (b) calling operating system application program interface functions using the state and transition data from the finite state machine to execute the one or more tests upon reaching the states represented by the state objects.

28. An apparatus as recited in claim 20, further comprising means for creating and storing one or more data stores, wherein each of the data stores comprises a stored association of (a) a set of objects associated with of a computer program application under test, (b) a computer program application under test, and (c) computer program code for the one or more tests.

* * * * *

UNITED STATES PATENT AND TRADEMARK OFFICE
CERTIFICATE OF CORRECTION

| | | |
|---|---|---|
| PATENT NO. | : 7,979,849 B2 | Page 1 of 1 |
| APPLICATION NO. | : 10/966962 | |
| DATED | : July 12, 2011 | |
| INVENTOR(S) | : Jeffrey Feldstein et al. | |

It is certified that error appears in the above-identified patent and that said Letters Patent is hereby corrected as shown below:

Claim 9, column 13, line 8, Delete "of"

Claim 18, column 15, line 20, Delete "a"

Signed and Sealed this
Thirtieth Day of August, 2011

David J. Kappos
*Director of the United States Patent and Trademark Office*